United States Patent [19]
Lin

[11] Patent Number: 6,007,447
[45] Date of Patent: Dec. 28, 1999

[54] TRANSMISSION UNIT FOR THE DISK MOTOR OF AN ELECTROMOTIVE BICYCLE

[76] Inventor: Shou-Mei Lin, No.7, Alley 6, Lane 141, Fu-Hsing N. Rd., Taipei, Taiwan

[21] Appl. No.: 09/175,333

[22] Filed: Oct. 20, 1998

[30] Foreign Application Priority Data

Apr. 30, 1998 [TW] Taiwan ................................. 87206708

[51] Int. Cl.$^6$ ................................................. B62K 11/00
[52] U.S. Cl. ......................... 475/149; 475/323; 475/324; 180/206
[58] Field of Search .................... 475/149, 323, 475/324; 180/206, 207

[56] References Cited

U.S. PATENT DOCUMENTS

| | | | |
|---|---|---|---|
| 3,921,741 | 11/1975 | Garfinckle et al. | 180/34 |
| 4,900,046 | 2/1990 | Aranceta-Angoitia | 475/149 X |
| 5,242,335 | 9/1993 | Kutter | 475/4 |
| 5,269,733 | 12/1993 | Anthony, III | 475/149 X |
| 5,474,148 | 12/1995 | Takata | 180/206 |
| 5,607,369 | 3/1997 | Yang | 475/324 X |
| 5,763,980 | 6/1998 | Li | 310/323 |
| 5,845,727 | 12/1998 | Miyazawa et al. | 180/207 X |

*Primary Examiner*—Khoi Q. Ta
*Attorney, Agent, or Firm*—Bacon & Thomas

[57] ABSTRACT

A transmission unit includes a main gear and driving power is transmitted to the main gear through a first driving unit, then further transmitted to an inner ring gear through a planetary gear. The power of the inner ring gear is transmitted to a driving element for driving a wheel through an unidirectionally second driving unit. The driving element may rotate independently, while the inner ring gear and the planetary gear will not be driven by the driving element.

6 Claims, 4 Drawing Sheets

6,007,447

TRANSMISSION UNIT FOR THE DISK MOTOR OF AN ELECTROMOTIVE BICYCLE

BACKGROUND OF THE INVENTION

1. Field of the Invention

The invention is related to an improved device of the disk transmission unit for an electromotive bicycle with particular reference to how the transmission device is rotated idly and reduce noises.

2. Description of the Prior Art

The so call bicycle in the present invention include a double wheel bicycle, and any bike which has at least double wheels that is directly driven by electric power.

The difference between the disk transmission unit of an electromotive bicycle and car, or motorcycle, or other vehicle is that an electromagnetic field is formed between the stator and rotor. A current is supplied by a battery to rotate the rotor. The related prior art may refer to U. S. Pat. Nos. 5,164,623, 5,450,915, 5,272,938, 4,490,637, 3,095,516, 4,021,690, and U.S. Pat. No. 3,792,742.

Since the initial rotary speed of the rotor is not suitable for driving the wheels directly and in order to increase the torque of the output electromagnetic field, in general, a deceleration gear must be used to reduce speed and increase torque.

The prior art transmission unit of the disk motor of an electromotive bicycle will generate large noises, especially, in the case that the stator is installed on the wheel axis to drive the wheel frame.

When the power is fed into the prior-art transmission device, the inner ring gear is driven by an main gear through a planet gear, and the spoke fixing the inner ring gear is rotated therefor. As the current is interrupted, the spoke will rotate continuously by the inertial force, thus the inner ring gear will rotate. Although in the prior art device, an unidirectional clutch is installed between a deceleration gear set and an active gear, the planetary gear and inner ring gear on the periphery thereof is possible to prevent the free rotation of the spoke.

SUMMARY OF THE INVENTION

Therefore, the object of the present invention is to provide an improved device of the transmission unit of a disk motor in an electromotive bicycle so as to prevent the inner ring gear and the planetary gear to idly rotate with a spoke. Thus the activity of the idle rotation of a spoke is also hindered.

A further object of the present invention is to provide an improved device of a disk transmission unit of an electromotive bicycle the noise of which can be reduced.

In the improved device of the present invention, the driving power of the electromagnetic field in the disk motor is transmitted to an main gear through a first driving unit, then further transmitted to a inner ring gear through a planetary gear; next the power of the inner ring gear is transmitted to a driving piece for driving wheel through an unidirectionally second driving unit, so that the driving piece may rotate independently, while the inner ring gear and the planet gear will not be driven.

One or more planet gear may be used. The unidirectional driving unit may be an unidirectional clutch, such as pawl unit and ratchet. Another generally used unidirectionally driving unit is a unidirectional bearing. However, it may also be used in the present invention.

The present invention will be better understood and its numerous objects and advantages will become apparent to those skilled in the art by referencing to the following drawings in which:

DETAILED DESCRIPTION OF THE PREFERRED EMBODIMENT

Figure 1:
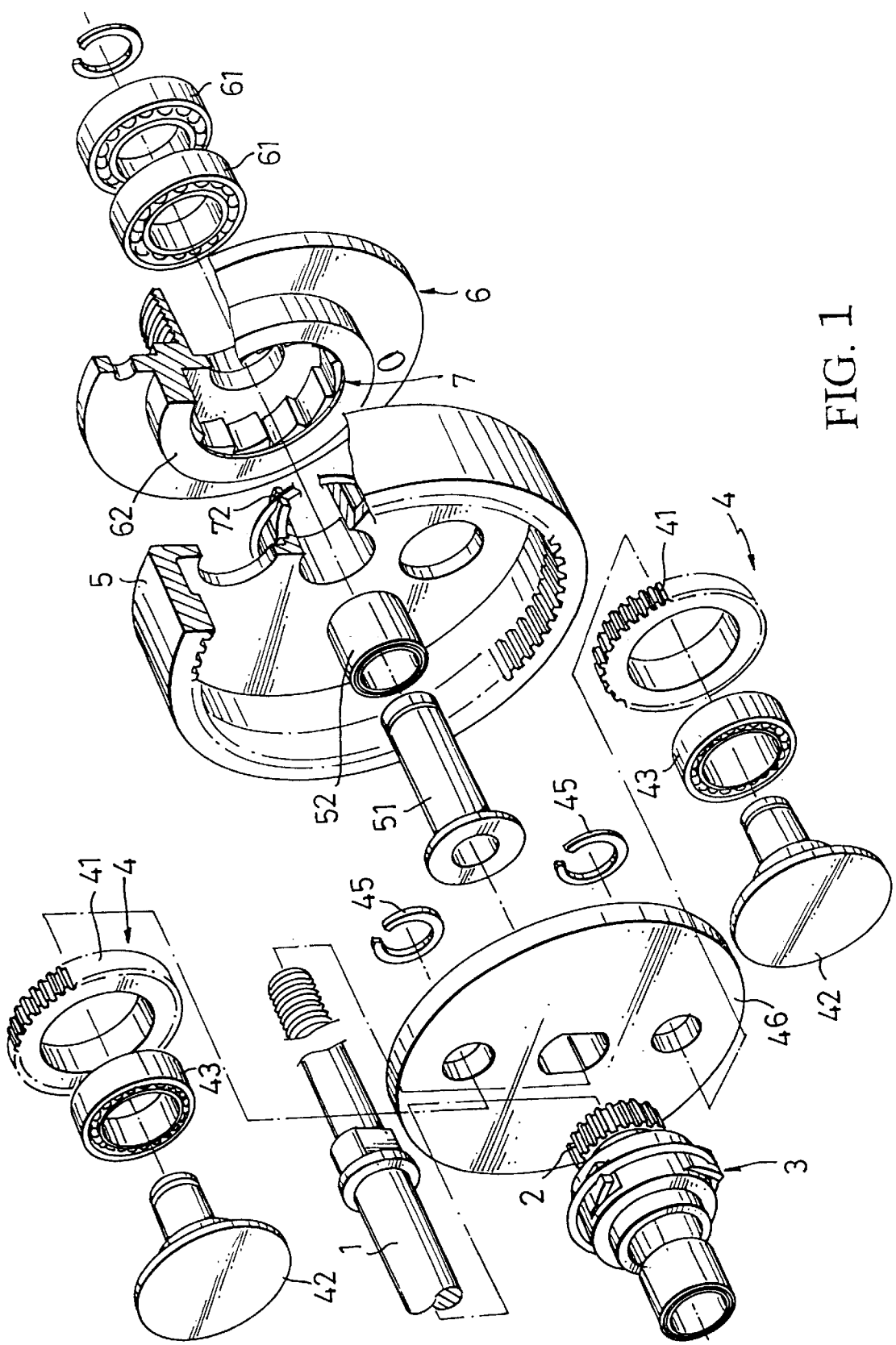
FIG. 1 is an exploded view of components of the embodiment in the present invention.
Figure 2:
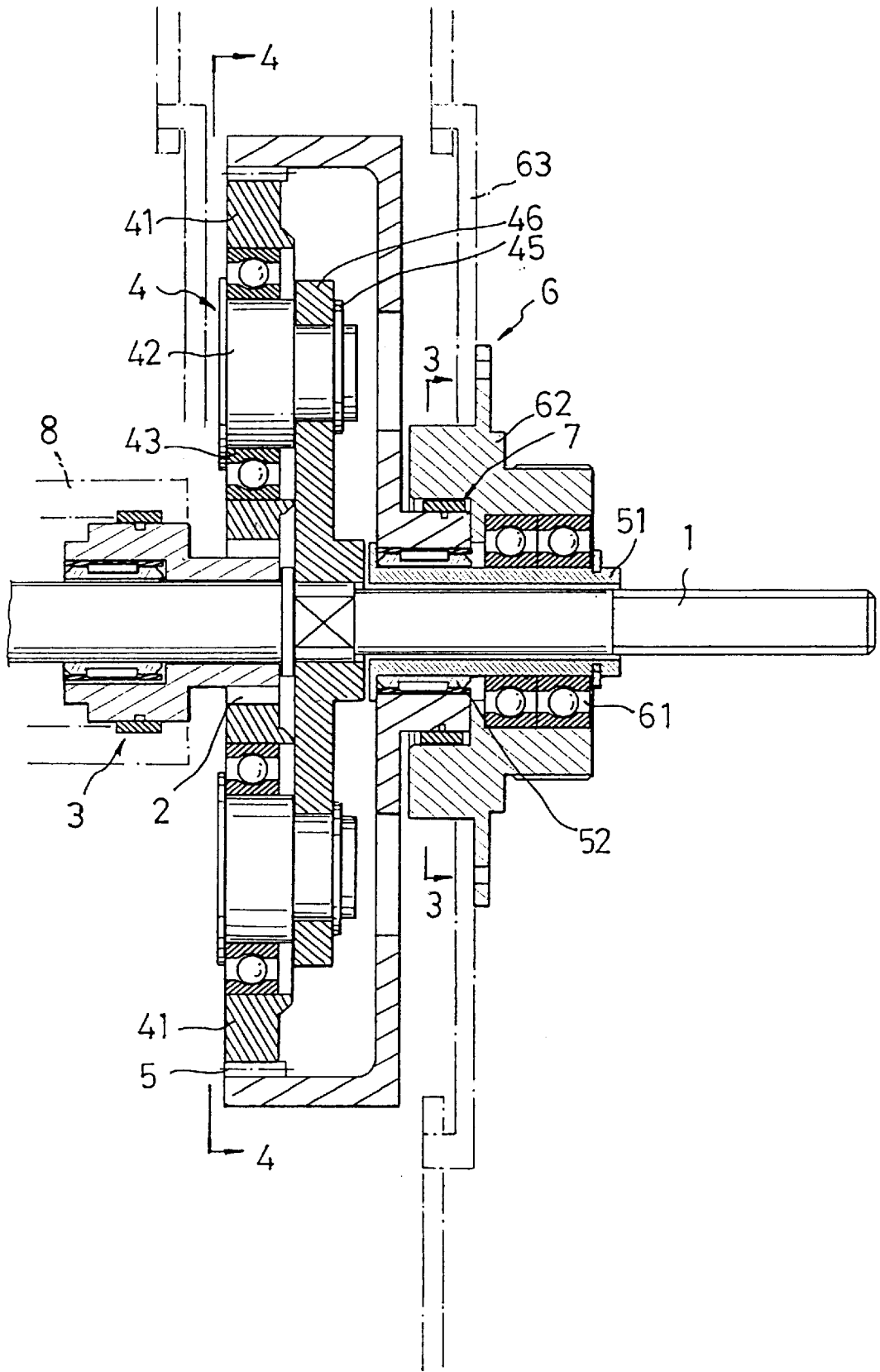
FIG. 2 is the cross-sectional view of the embodiment of the present invention.

Referring to FIGS. 1 and 2, the transmission device of the present invention comprises a fixing axis (1); an main gear (2) pivotally installed on the fixing axis (1), the main gear is drive to rotate by the power of an electromagnetic driving element (8) through a first driving unit (3), for example, an unidirectional clutch, or an unidirectional bearing or other equivalent units. Another, an inner ring gear (5) is pivotally installed on the fixing axis (1) with a bearing (5) by an bush (51); and a planetary gear unit (4) retaining between the main gear (2) and the inner ring gear (5) so to rotate around the main gear (2) while to drive the inner ring gear (5). The transmission device of the present invention further has a driving element (6) pivotally on the bush (5) for driving a car through the bearing (61), and an unidirectional driving unit (7) located between the inner ring gear (5) and the ratchet wheel (62). By which the inner ring gear (5) may drive the driving element (6) unidirectionally, and when the driving element (6) rotates by itself, the inner ring gear will not be driven.

The driving piece is used to drive the wheel frame of a wheel and includes a ratchet wheel (62) pivotally installed on the fixing axis (1) through the bearing (61) and a spoke (63) fixed with the ratchet wheel (62) for locking the components of the wheel frame.

The first driving unit (3) may be a connector or an assembling element like a key in a key way. However, in order to finally adjust a disk motor in combination, it is preferably that the unidirectional driving unit of the second driving unit (7) is used.

Figure 3:
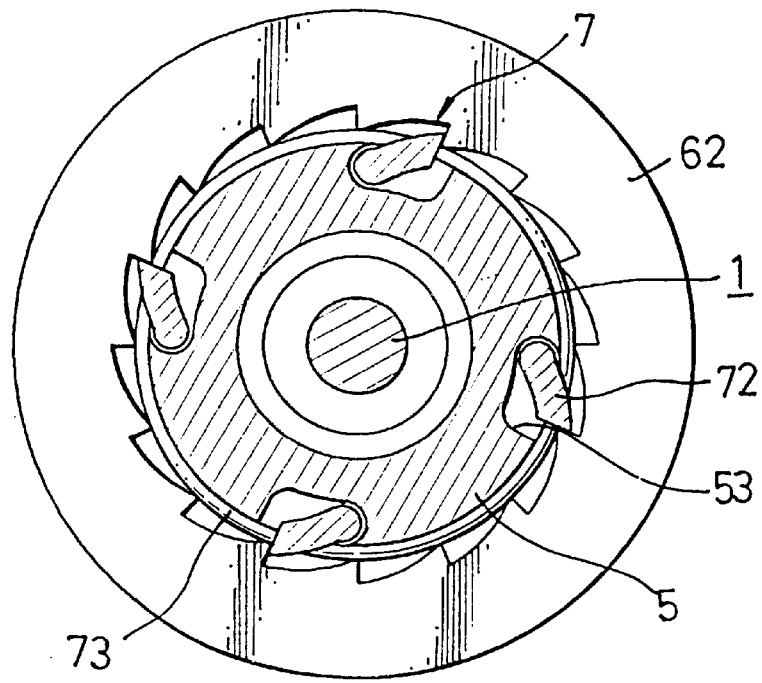
FIG. 3 is a cross-sectional view along line 3—3 of FIG. 2.

The unidirectionally second driving unit (7) may be a unidirectional clutch as shown in FIGS. 1 and 3, or unidirectional bearing, or other equivalent components. The embodiment of a unidirectional clutch is shown in FIG. 3, one or a plurality of concave portions (53) are installed on the outer periphery of the inner ring gear (5), another one or a plurality of pawls are installed. The base of each pawl is held within the concave portion (53) by a spring, for example a ring spring (73). The ratchet wheel (62) of the driving element (6) has a plurality of inner ratchet for being engaged by the pawl (72) unidirectionally. When the ratchet wheel (62) is rotated clockwise, each pawl (72) will be pressed by the gears of the ratchet wheel (62). Therefore, the power of the spoke (63) will not be transmitted to the inner ring gear (5).

Figure 1A:
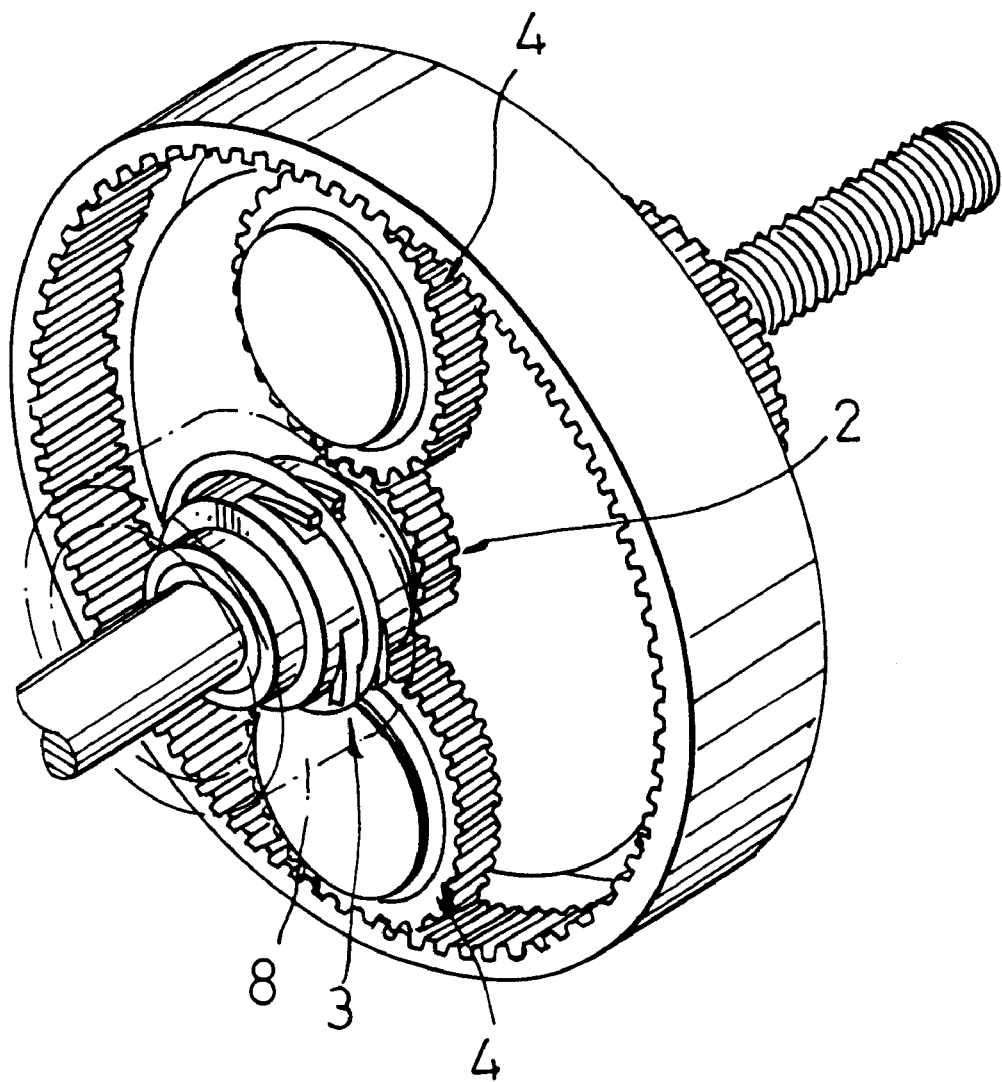
FIG. 1A is a partial perspective view showing the planetary gear unit being able to rotate around the sun gear.
Figure 4:
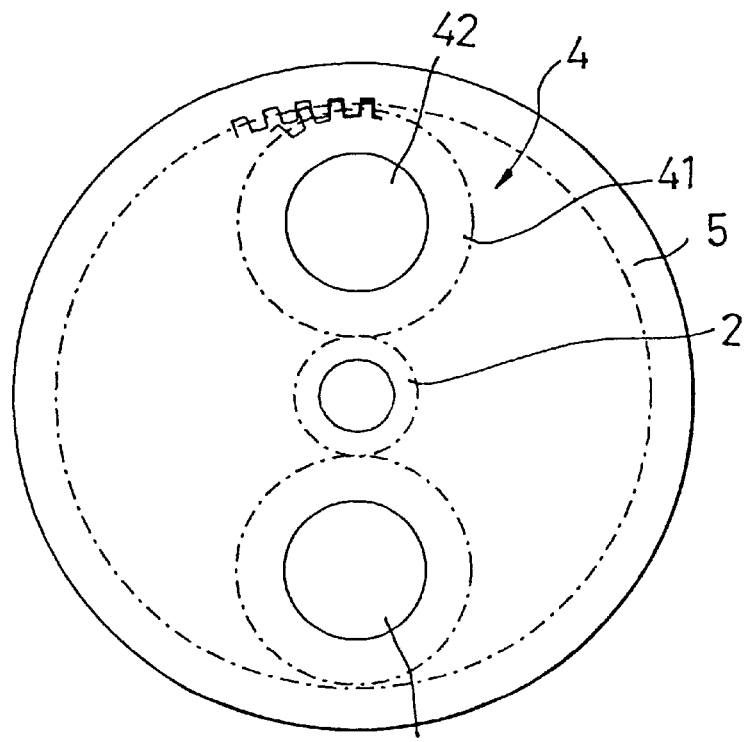
FIG. 4 is a cross-sectional view along line 4—4 of FIG. 2.

In the planetary gear unit (4) as shown in FIGS. 1, 1A, and 4, the short axis of a planetary gear (41) is supported by a planetary axial arm with an unique or plurality of arms. The short axis (42) is fixed on the planetary axis arm (46) by a retainer (45), and the planetary gear (41) is installed on the short axis (42) by the bearing (63), so as to engage with the inner ring gear (5) and the main gear (2), simultaneously. When the electromagnetic driving component (8) rotates, by the transmission of the first driving unit (3), the main gear on the end portion thereof will drive the planetary gear to rotate, then to drive the driving element (6) and the spoke (63) to rotate by the second driving unit (7).

When the electromagnetic driving component (8) is stopped to rotate, the spoke (63) will rotate continuously by the force of the spoke. Since the power will not be transferred to the inner ring gear (5), driving element (6) connected with the spoke (63) may rotate independently not to drive the inner ring gear and the planetary gear. Thus the activity in idle rotation is increased and the noise generated from the transmission of a plurality of gears can be reduced.

Those skilled in the art will readily recognize various modifications and changes which may be made to the present invention without strictly following the exemplary embodiment and application illustrated and described herein, and without departing from the true spirit and scope of the present invention which is set forth in the following claims.

What is claimed is:

1. An improved device of the transmission unit of the disk motor in an electromotive bicycle, comprising:

a fixing axis;

a first driving unit pivotally installed on said fixing axis;

an main gear pivotally installed on said fixing axis, which is drive to rotate by power of an electromagnetic driving element through said first driving unit;

an inner ring gear pivotally installed on said fixing axis;

a planetary gear unit retaining between said main gear and said inner ring gear so to rotate around said main gear and to drive said inner ring gear;

a driving element for driving a wheel of an electromotive bicycle; and an unidirectionally second driving unit located between said inner ring gear and said driving element, by which said inner ring gear drive said driving element unidirectionally therefor.

2. The device as recited in claim 1, wherein said first driving unit is an unidirectional clutch.

3. The device as recited in claim 1, wherein said second driving unit is an unidirectional clutch.

4. The device as recited in claim 1, wherein said driving element includes a ratchet wheel pivotally installed on said fixing axis and a spoke fixed with said ratchet wheel for locking the wheel frame components.

5. The device as recited in claim 2, wherein said unidirectional clutch includes:

a pawl seat on the outer periphery of which at least one of concave portion are installed;

pawl units the bases of which are retained on said concave portion of said pawl unit; and a ratchet element having an inner ratchet wheel for engaging with said pawl unit.

6. The device as recited in claim 3, wherein said unidirectional clutch includes:

a pawl seat on the outer periphery of which at least one of concave portion are installed;

pawl units the bases of which are retained on said concave portion of said pawl unit; and a ratchet element having an inner ratchet wheel for engaging with said pawl unit.

* * * * *